Patented Aug. 3, 1948

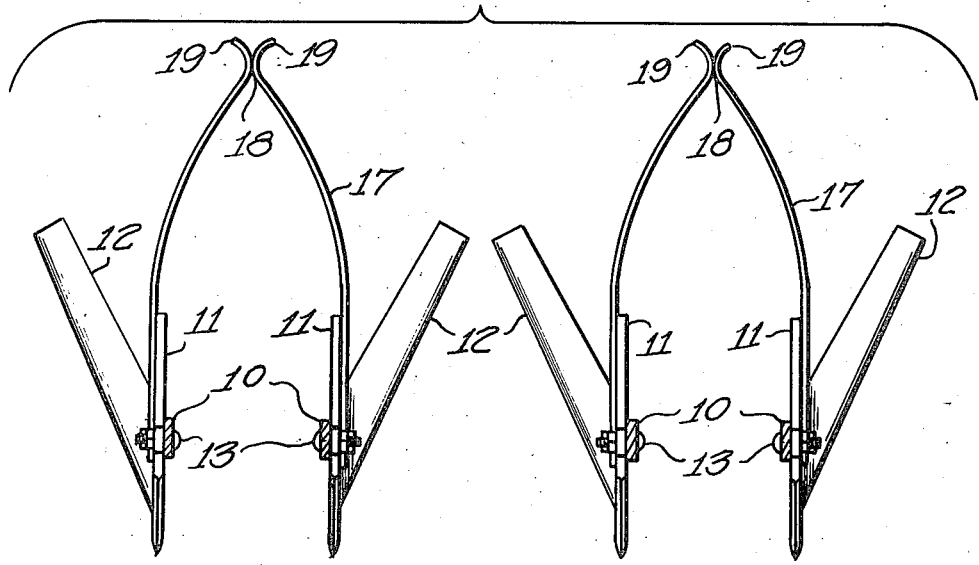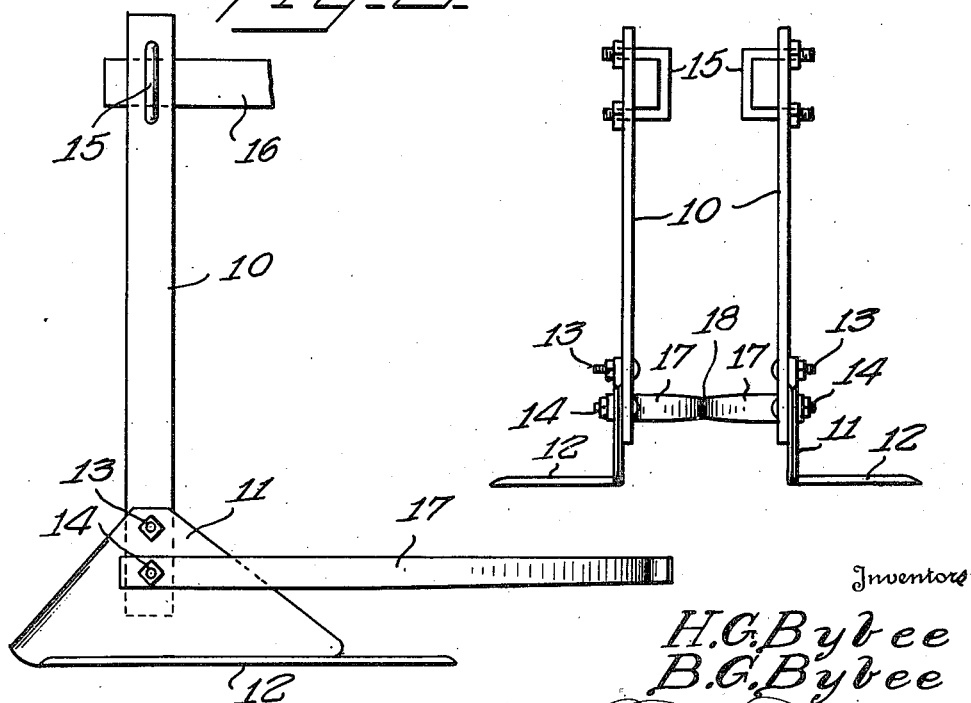

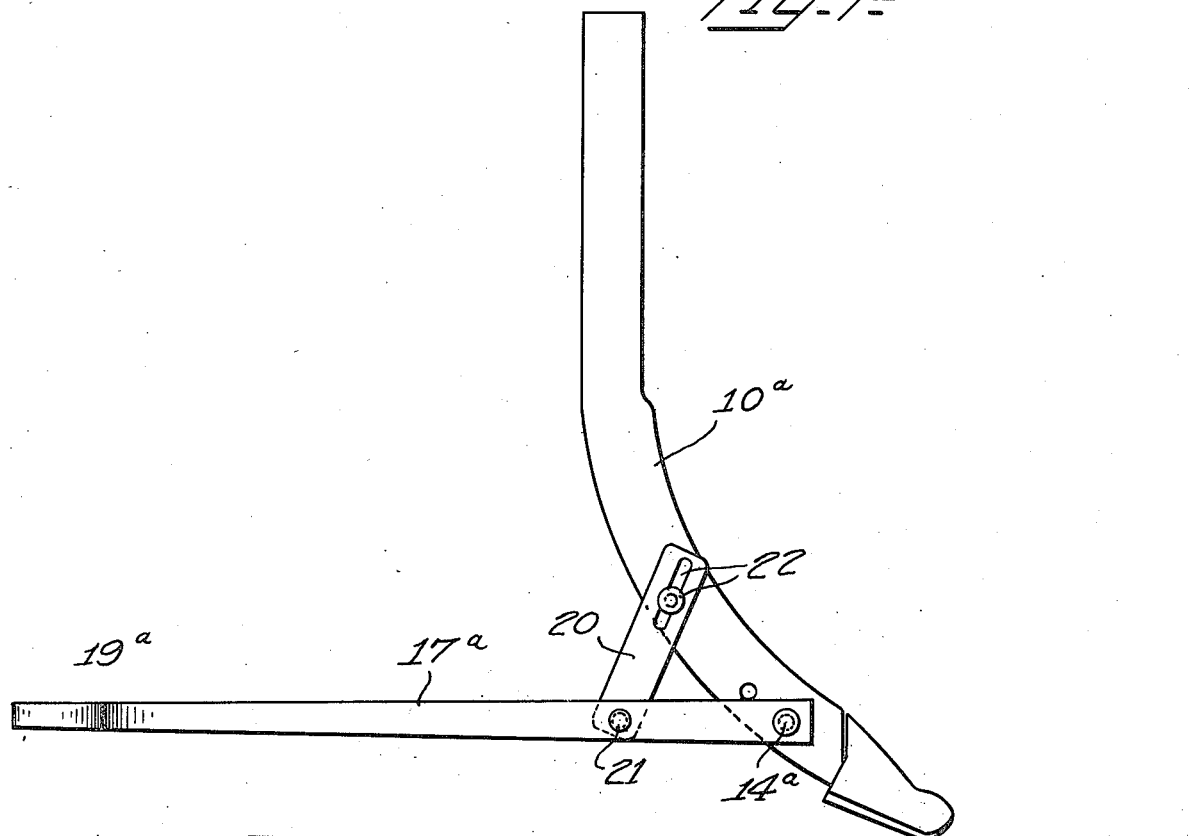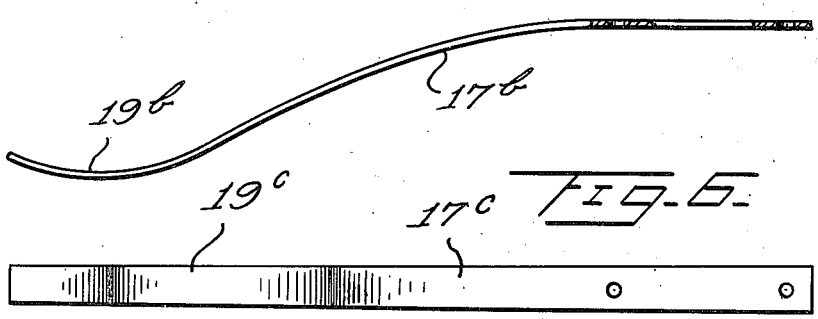

2,446,259

UNITED STATES PATENT OFFICE 2,446,259

WEEDER ATTACHMENT FOR CULTIVATORS AND THE LIKE

Howard G. Bybee and Byrom G. Bybee, Ontario, Oreg.

Application April 24, 1945, Serial No. 589,980

1 Claim. (Cl. 97—207)

This invention relates to certain new and useful improvements in weeder attachments for cultivators and the like.

In the cultivation of growing plants, such as vegetables, it has heretofore been customary to turn the soil between the rows of growing plants for the unearthing or elimination of weeds, but such methods do not remove the weeds that grow to line with vegetable plants and the like. In the weeding of truck gardens and for the cultivation of growing vegetable and other plants, it has also been the practice to use a cutter for the elimination of weeds, but such cutters usually remove the weed above the ground line and do not disturb the root so that the growing groups of weeds will continue to crowd out the growing plants and retard development thereof.

The primary object of the present invention is to provide a weeder attachment for cultivators and the like wherein the ground between the rows of growing plants is turned over by the cultivator blade to remove the weeds between the rows of growing plants and the weeder attachment for the cultivator is of a character and is so arranged as to operate in the line of the rows of growing plants to remove the weeds and their roots from such lines and between the plants without harming or disturbing the growing plants.

With the above and other objects in view that will become apparent as the nature of the invention is better understood, the same consists in the novel form, combination and arrangement of parts hereinafter described, shown in the accompanying drawings and claimed.

In the drawings:

Figure 1 is a top plan view partly in section, showing weeder attachments for two associated pairs of cultivators, Figure 2 is a front elevational view of one pair of cultivators showing the two resilient weeder arms respectively carried by the cultivators, with the work portions thereof disposed midway between the two cultivators.

Figure 3 is a side elevational view of one cultivator with a weeder arm attached thereto, Figure 4 is a side elevational view of a single cultivator and showing a weeder arm adjustably attached thereto, Figure 5 is an edge elevational view, partly in section, showing another form of weeder arm of greater curvature at the weed-engaging end thereof, and Figure 6 is a side elevational view of a still further form of weeder arm illustrating a different curvature in the arm at the weed-engaging portion thereof.

While the weeder attachment disclosed herein may be employed in tractor cultivators involving any number of cultivator blades, there is illustrated in Figure 1 two pairs of cultivator blades with a weeder arm attached to each blade of each pair. Each cultivator comprises a perpendicular shank 10 rising from a vertical wall 11 of a normally horizontally disposed cultivator shoe blade 12, the shank being suitably secured to the wall 11 as by nut and bolt combinations 13 and 14. The upper end of the shank 11 has a clevis connection 15 with the draw bar 16 of a tractor or the like or other propelling means.

The cultivators are arranged in pairs as illustrated in Figures 1 and 2 and are adapted to straddle a row of growing plants for the cultivation of the earth at opposite sides of the row of plants and the weeders are attached to each cultivator preferably by means of the nut and bolt combination 14 that secures the shank 10 to the wall 11 of the cultivator. Each weeder attachment comprises a resilient arm 17 preferably of the form shown in top plan view in Figure 1, one end of each weeder arm being anchored in position relative to the cultivator by the nut and bolt combination 14, while the curvature of the resilient weeder arms 17 is such that the rear ends thereof are directed toward each other for contact as indicated at 18 midway between the two cultivators and in the line of the row of growing plants. The point of contact 18 between the weeder arms 17 is on a curved line afforded by the outwardly flaring ends 19 of the weeder arms. The connection between each weeder arm 17 and its associated cultivator is such as to cause the rear ends 19 of the weeder arms and the zone of contact 18 therebetween to travel slightly below the surface of the ground for purposes presently to appear.

With the weeder arms 17 arranged as illustrated in Figures 1 and 2, the cultivator blades 12 turn over the soil between the rows of growing plants for the cultivation of plants and the elimination of weeds between such rows, while the resiliency of the weeder arms 17 is such as to cause the rear ends 19 thereof to grip the weeds below the ground line and in the zone of the roots thereof for pulling the weeds out of the ground that grow in line with the rows of plants. As vegetable and similar plants are more firmly rooted than the weeds and with predetermined resiliency embodied in the weeder arms, the latter open or separate at their rear ends 19 when passing in contact with a growing plant without in any way injuring the latter, the weed pulling ends 19 of the weeder arms again moving into contact with each other for the pulling of weeds after said ends have passed a growing plant. The weeder arm of this invention is especially adapted for the cultivation or weeding of such vegetables as potatoes, carrots, beets, onions, and similar crops, and by determining the amount of inherent resiliency in the weeder arms, the device may be employed for the weeding of other vegetables and flowers.

While it is shown in Figure 1 that the point of contact between the resilient arms 17 is at the center of the curvature of the outwardly flaring ends 19 of the arms, it is to be understood that one weeder arm 17 may be set slightly in advance of the other and that the weeds will similarly be effectively pulled from the ground and, further, that the weeder arms when so contacted with each other will not cause any damage or injury to growing plants as distinguished from weeds.

In the form of the invention illustrated in Figure 4, the shank 10$^a$ of the cultivator has the resilient weeder arm 17$^a$ pivotally attached at one of its ends as at 14$^a$ to the lower end of the cultivator shank in proximity of the cultivator shoe, while a brace arm 20 pivotally attached as at 21 at its lower end to the weeder arm 17$^a$ rearwardly of the pivot 14$^a$ has an adjustable pin and slot connection 22 at its other end with the cultivator shank 10$^a$, this arrangement being such that the rear weed gripping end 19$^a$ of the arm 17$^a$ may be adjusted as to its depth for travel beneath the ground line.

The form of weeder arm 17$^b$ shown in Figure 5 has a relatively wide weed-gripping end 19$^b$ as distinguished from the lesser arc of curvature shown in Figure 1.

In the form of invention shown in Figure 6, the weeder arm 17$^c$ has a well defined arcuate weed-gripping portion 19$^c$ spaced from its rear terminal end.

From the above detailed description of the invention, it is believed that the construction and use thereof will at once be apparent, it being noted that the weeder attachment is defined for the removal of weeds from the line of growing plants and between such plants, the cooperation between the weeder arms being such as to pull the weeds from the ground and pass around the growing plants without injury thereto. With a weeder attachment of the type disclosed herein, the earth between the rows of growing plants is cultivated for the elimination of weeds and the weeds are removed from the line of growing plants without injury to the plants.

While there are herein shown and described the preferred embodiments of the invention, it is nevertheless to be understood that minor changes may be made therein without departing from the spirit and scope of the invention as claimed.

We claim:

In a weeder attachment for cultivators, the combination with a pair of cultivator shoes, each arranged at the lower end of a shank, of an elongated reversely curved resilient sheet metal weeder arm pivotally attached at its forward terminal end to the lower end of each shank in proximity of the cultivator shoe and extending rearwardly therefrom throughout its length in a plane normally substantially parallel to the surface of the ground to be cultivated, the rear extremities of said weeder arms being bowed toward each other and normally forming a vertical line contact with each other forwardly of the rear terminal ends thereof, and means for selectively varying the angular relation between said weeder arms and the ground including a brace bar pivotally attached at one end to the weeder arm rearwardly of its pivotal mounting and having an adjustable pin and slot connection at its other end with the shank carrying the cultivator shoe.

HOWARD G. BYBEE.
BYROM G. BYBEE.

REFERENCES CITED

The following references are of record in the file of this patent:

UNITED STATES PATENTS

| Number | Name | Date |
|---|---|---|
| 770,870 | Sleeper | Sept. 27, 1904 |
| 2,307,533 | Neumann | Jan. 5, 1943 |